United States Patent [19]
Vertens et al.

[11] Patent Number: 5,369,948
[45] Date of Patent: Dec. 6, 1994

[54] METHOD OF OPERATING A GAS TURBINE AND A PROCESS AND APPARATUS FOR STARTING A GAS TURBINE

[75] Inventors: Peter Vertens, Löptin; Bernd Dräger, Schinkel, both of Germany

[73] Assignee: MaK System Gesellschaft mbH, Kiel, Germany

[21] Appl. No.: 132,093

[22] Filed: Oct. 5, 1993

[51] Int. Cl.$^5$ .................................................. F02C 7/26
[52] U.S. Cl. .................................. 60/39.02; 60/39.141
[58] Field of Search ............... 60/39.02, 39.03, 39.141, 60/39.281, 734

[56] References Cited

U.S. PATENT DOCUMENTS

| | | | |
|---|---|---|---|
| 3,520,133 | 7/1970 | Loft et al. | 60/39.281 |
| 3,688,495 | 9/1972 | Fehler et al. | 60/39.281 |
| 3,793,825 | 2/1974 | Dickhart et al. | 60/39.141 |
| 3,991,558 | 11/1976 | Schroff | 60/39.141 |
| 4,015,426 | 4/1977 | Hobo et al. | 60/39.281 |
| 4,454,713 | 6/1984 | Meyer et al. | 60/39.281 |

*Primary Examiner*—Louis J. Casaregola
*Attorney, Agent, or Firm*—Nils H. Ljungman & Associates

[57] ABSTRACT

Method of operating a gas turbine and a process and apparatus for starting a gas turbine. In this apparatus with a startup controller for a gas turbine, the amount of fuel injected by controlled dosing pumps is determined, whereby the amount of fuel injected can be regulated as a function of the difference between the injection pressure and the compressor pressure in the combustion chamber of the turbine, or at the compressor outlet.

19 Claims, 3 Drawing Sheets

METHOD OF OPERATING A GAS TURBINE AND A PROCESS AND APPARATUS FOR STARTING A GAS TURBINE

BACKGROUND OF THE INVENTION

1. Field of the Invention

This invention relates to gas turbines and more particularly a process and an apparatus for starting a gas turbine by means of a startup controller which is located in an electronic control circuit with a turbine speed sensor, a speed governor or regulator and a pressure sensor for the injection and compressor or supercharger pressure, as well as dosing pumps, and in which signals concerning the speed and pressure can be processed in electronic units.

2. Background Information

For small drive units in particular, in which the fuel requirement is generally a function of the turbine speed, and in which an optimal starting mixture between the amount of air and fuel is guaranteed only in certain higher speed ranges, during the starting process, an attempt is made to drive the turbine by means of the starter at the highest possible speeds, and only then is the fuel ignited and injected. That requires a relatively large starter and a correspondingly large amount of starting energy. The start is also very much a function of the starting conditions, such as air pressure, ambient temperature, fuel viscosity and ignition quality. False starts and backfiring are frequently the result.

OBJECT OF THE INVENTION

The object of the invention is to use simple electronic means to improve processes and systems of this type, and to create a startup controller which interacts with a turbine controller.

SUMMARY OF THE INVENTION

The invention teaches that this object can be accomplished if, in a first control stage, the quantity of fuel is controlled by means of the dosing pumps so that a specified difference is achieved between the compressor pressure and the injection pressure, and in a second pressure stage, after an ignition criterion has been fulfilled, the amount of fuel is increased so that the turbine speed reaches the rated or nominal speed in a specified period of time, and in a third control stage, the turbine control is taken over by the speed governor, and the turbine is held at a constant speed independently of the load. Additional advantageous features are disclosed hereinbelow.

The invention teaches that the startup controller, by means of dosing pumps which work independently of the turbine speed, in a first stage controls the amount of fuel so that a specified difference is achieved between the compressor pressure and the injection pressure. This difference can be defined so that even at low startup speeds, there is an ignitable fuel-air mixture at the ignition device.

A second control stage is activated after an ignition criterion has been fulfilled (e.g. a specified speed in a defined period of time) and increases the quantity of fuel so that the turbine speed reaches the rated speed in a specified length of time. As a result of this control process, it is possible to compensate for all the effects of temperature, fuel quality, fuel viscosity, etc. on the run-up time.

After reaching the rated speed, in a third control stage the normal speed governor takes over control of the turbine, and keeps the turbine at a constant speed independently of the load.

In this operating phase, the startup controller, using the signals available to it for injection pressure, compressor pressure and speed gradient, takes over the safety functions for monitoring the turbine. In other words, it gives an alarm or a disconnect signal, when the above-mentioned signals exceed or drop below specified values. For example, it interprets a change in the fuel pressure to mean that one of the two redundantly operating pumps has failed.

The startup controller becomes particularly simple and effective if the fuel is fed by pulse-width controlled piston pumps. In particular, the pressure pulses which are conventional with piston pumps promote the ignition process, because they cause an increase in the length of time during which an ignitable fuel-air mixture exists at the ignition device.

One aspect of the invention resides broadly in a process for starting and operating a gas turbine by means of a startup controller, the gas turbine comprising: a compressor, a turbine speed sensor, a speed governor, a pressure sensor for the fuel injection pressure, a compressor pressure sensor, and dosing pump for feeding fuel into the gas turbine; the process comprising: feeding signals from a turbine speed sensor, a speed governor, a pressure sensor for the injection pressure, and a compressor pressure sensor of the turbine; processing said signals relating to speed and pressure; the process further comprising: controlling an amount of fuel, in a first stage of starting, by controlling the dozing pumps so that a specified difference is achieved between a pressure within the compressor of the gas turbine and the injection pressure of fuel to the gas turbine; sensing an ignition criterion in the gas turbine; increasing, in a second stage of starting, after said ignition criterion has been fulfilled, the amount of fuel so that the turbine speed reaches the rated speed in a specified period of time; transferring, in a third control stage, the turbine control to a speed governor for running the turbine at a substantially constant rate of speed; and maintaining the turbine at a substantially constant speed substantially independent of load.

BRIEF DESCRIPTION OF THE DRAWING

Embodiments of the invention are illustrated in the accompanying drawings and described below in greater detail.

DESCRIPTION OF THE PREFERRED EMBODIMENTS

Figure 1:
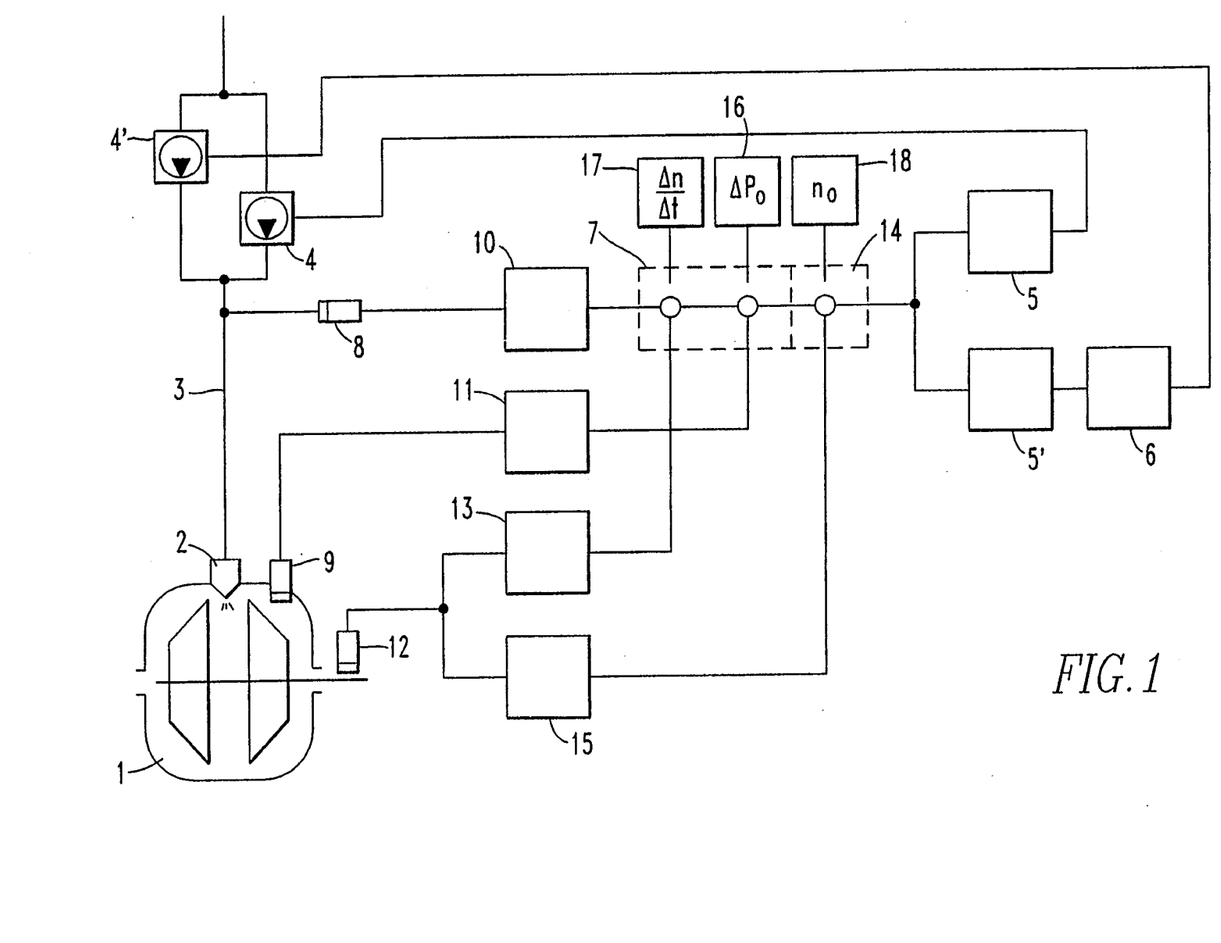
FIG. 1 shows schematically the structure of the startup controller, in connection with the speed governor, which speed apparatus may be a device of the prior art.

As shown in FIG. 1, a turbine 1 is fed with fuel by means of an injector nozzle 2 and a fuel line 3 from dosing pumps 4, 4' operating in parallel. The pumps 4, 4' are powered by electrical power supply units 5 and 5', e.g. with pulsewidth-modulated currents, which drive them so that they operate as dosing pumps. The two pumps 4, 4' are designed as piston pumps and are operated in opposite phase to one another to limit the delivery pressure pulsations. This type of operation is achieved by a phase shifter 6 for the signal to the one pump 4'.

The startup controller 7 receives the signals from the pressure sensors 8 and 9 for the injection pressure and for the compressor pressure, which are processed in electronic units 10 and 11. Moreover, the startup controller 7 receives the signal from the turbine speed sensor 12, which is processed in an additional electronic unit. The downstream speed governor 14, which also receives the signal from the speed sensor 12 via the electronic unit 15, is not active during the starting phase.

The starting process can take place as follows, for example:

A starter (not shown) is used to run up the turbine 1. When a defined compressor pressure is reached, the startup controller 7 puts the dosing pumps 4, 4' in operation, and controls them so that the pressure differential at the sensor 8 (injection pressure) and 9 (compressor pressure) is approximately equal to the specified pressure 16 (delta $P_o$). Ignition occurs. The turbine speed is accelerated, increases and exceeds a specified speed gradient 17, as an indication that ignition has occurred. Thus the startup controller 7 switches to the speed signal, and by corresponding dosing of the fuel, increases the speed along a specified speed gradient 17 to the rated speed 18 ($n_o$). Shortly before the rated speed 18 is reached, the speed governor 14 takes over the fuel regulation, and keeps the turbine 1 at the specified rated speed 18, independently of the load. The startup controller 7 with the corresponding sensors remains active during the phase of rated operation, and monitors the turbine 1, e.g. with regard to unacceptable pressures, speeds and combinations.

The startup controller 7 in various embodiments may be analog circuits, or an analog computer or alternatively a digital computer with appropriate analog-to-digital and/or digital-to-digital transducers and/or conversion circuitry. The various circuits in the controller 7 include scaling circuits, clock circuits and memory circuits, among others.

Some examples of small gas turbines in which some embodiments of the present invention and an invention described below could be utilized are U.S. Pat. No. 5,207,054, which issued May 4, 1993, entitled: Small Diameter Gas Turbine Engine, invented by Colin Rodgers, Jack R. Shekleton and Anthony C. Jones; U.S. Pat. No. 5,131,782, which issued Jul. 21, 1992, entitled: Shaft Coupling For Gas Turbine Engine, invented by Vittorio Bruni and Edwin C. Tetsull; U.S. Pat. No. 4,086,760, which issued May 2, 1978, entitled: Gas Turbine, invented by Richard Chute; U.S. Pat. No. 4,000,609, which issued Jan. 4, 1977, entitled: Radial Flow Gas Turbine Engine With Annular Combustor Liner, invented by Richard Chute; and U.S. Pat. No. 5,115,638, which issued May 26, 1992, entitled: Propulsion Turbine Fuel Control System, invented by Wendell E. Reed and Malcolm J. McArthur.

Some examples of control gas turbines in which some embodiments of the present invention and an invention described below could be utilized are U.S. Pat. No. 4,464,895, which issued Aug. 14, 1984, entitled: Gas Turbine Engine Starting Technique and Control, invented by Terry Morrison and Jay D. Meador; U.S. Pat. No. 4,274,255, which issued Jun. 23, 1981, entitled: Control For Start-up of a Gas Turbine Engine, invented by Robert R. Pollak; U.S. Pat. No. 4,019,315, which issued Apr. 26, 1977, entitled: Gas Turbine Power Plant Control Apparatus Including A Temperature Reset Starting Control System and an Ignition Pressure Control System, invented by Robert A. Yannone and James J. Shields; and U.S. Pat. No. 3,902,315, which issued Sep. 2, 1975, entitled: Starting Fuel Control System For Gas Turbine Engines, invented by Anthony N. Martin.

One feature of the invention resides broadly in the process for starting a gas turbine by means of a startup controller which is located in an electronic control circuit with a turbine speed sensor, a speed governor and a pressure sensor for the injection and compressor pressure, as well as dosing pumps, and in which signals concerning the speed and pressure can be processed in electronic units, characterized by the fact that in a first control stage, the amount of fuel is controlled by means of the dosing pumps so that a specified difference is achieved between the compressor pressure and the injection pressure, and in a second pressure stage, after an ignition criterion has been fulfilled, the amount of fuel is increased so that the turbine speed reaches the rated speed in a specified period of time, and in a third control stage, the turbine control is taken over by the speed governor, and the turbine is kept at a constant speed independently of the load.

Another feature of the invention resides broadly in the process, characterized by the fact that the amount of fuel injected is regulated as a function of the difference between the injection pressure and the compressor pressure in the combustion chamber or at the compressor outlet in the electrical control circuit.

Still another feature of the invention resides broadly in the process, characterized by the fact that in a run-up phase, the turbine and the turbine speed are monitored by means of a sensor, and by appropriate dosing of the amount of fuel, the turbine is run up to the rated speed (no) in a specified time (t).

Yet another feature of the invention resides broadly in the process, characterized by the fact that in steady-state normal operation, the fuel feed is regulated by the speed governor to maintain a constant speed, and the difference between the injection pressure and the compression pressure, as well as the speed changes, are monitored by means of the startup controller, and when critical or unacceptable values are reached, a warning signal is emitted or a safe shutdown is performed.

Still yet another feature of the invention resides broadly in the device for the performance of the process, characterized by the fact that the startup controller 7 in the electrical circuit receives signals from the pressure sensor 8, 9 for the injection pressure and the compressor pressure, and the signal from the speed sensor 12, the signals from the pressure sensors 8, 9 are processed in the electronic units 10, 11, and the signal from the speed sensor 12 is processed in the electronic unit 13.

Another feature of the invention resides broadly in the startup controller, characterized by the fact that as the dosing pumps 4, 4' at least two pulsewidth-modulated piston pumps are used, which are pulsed in opposite phase to one another.

A further aspect of an invention described below relates to a process and an apparatus for the control of liquid fuel for gas turbines using piston pumps which transport the fuel to the fuel injector which can be used with the gas turbine system as described above.

On gas turbines, there are systems in which the fuel is injected into the combustion chamber at a uniform overpressure, where it is burned with a stationary flame. The overpressure must thereby be carefully adjusted as a function of the turbine load, the environmental conditions such as the pressure, quantity and temperature of the intake air, and the characteristics of the fuel (viscosity, ignition quality). The fuel pressure upstream of the fuel control unit must also be kept constant within strict limits.

For this purpose, feed pumps are used primarily, which are driven directly by the turbine. At these pumps, the injection pressure, and simultaneously the amount of fuel transported, must be adjusted by means of complex analog control mechanisms so that they correspond to the operating conditions indicated above. This system is excessively complex and expensive, in particular for small units, because the control valves used for the small amounts of fuel are expensive, and are very susceptible to fouling.

The same is true for feeding liquid fuels to other types of combustion chambers, e.g. for heating systems. In that case, the fuel and combustion air are generally transported by the same drive component, whereby the performance characteristics of the fan differ significantly from those of the feed pump. Therefore, here again, a control system is required which includes sensitive and expensive valves which are susceptible to fouling.

The object of the invention is to create a process and an apparatus, i.e. a fuel control unit, by means of which a constant feed of fuel is assured or guaranteed in sufficient amounts to operate the gas turbine, and in which the components of the fuel control unit are also economical and substantially insensitive to the problems experienced in systems of the prior art.

The invention described below teaches that this object can be achieved by activating the piston pumps by means of a pump control unit with an alternating current signal, the pulse-width of which is controlled as a function of the turbine speed and/or the pressure upstream of the injector pump. The information below discloses additional advantageous characterizing features of the invention.

As a result of the use of piston pumps with a stroke frequency of more than 30 Hz, in particular with at least two piston elements operating in opposite phase to one another, which are preferably designed as cam pumps, the two piston elements can be operated in opposing phases. This makes it possible to advantageously keep the fuel flow to the fuel injector sufficiently constant, whereby this constancy of the fuel flow is essentially a function of the delivery frequency as disclosed below, and of the number of piston elements operating simultaneously.

The length of the effective piston stroke as disclosed below can be controlled in the manner of the prior art by changing the valve timing by means of the cylinder geometry. As disclosed below, the use of free-floating piston pumps is particularly advantageous, in which the pistons, with the corresponding cylinders, form a part of the fuel line, and are driven inductively by an external current coil, without the need for additional openings and gaskets in the fuel system.

The quantity of fuel is controlled by regulating the pulse-width of the current pulse flowing through the current coil. The longer the pulse, the greater the amount of fuel per stroke, whereby the stroke frequency is preferably set to a constant value appropriate to the system.

Finally, as disclosed below, it is also advantageous to use the same pulse width controller for both pumps, to split the output signal to both pumps, and to invert or phase-shift the signal for one pump, so that when both pumps receive the signals uniformly, the pistons are operated in opposite phase.

In addition to the advantages indicated above, such as—simple, economical structure,
   low susceptibility to fouling,
   reliable electrical activation and control by primarily digital data processing,
   independence of the upstream fuel pressure (self-aspirated/naturally-priming),
the following additional advantages are gained:
   good ignition quality and stable flame, as a result of overlapping feed pulses of the fuel, which expands the range of optimal fuel/air ratios in the combustion chamber;
   emergency operating capability in the event of the failure of one of the two pumps,
   compensation of feed differences between the two pumps by evaluation of the pressure signals upstream of the fuel injector.

Figure 1A:
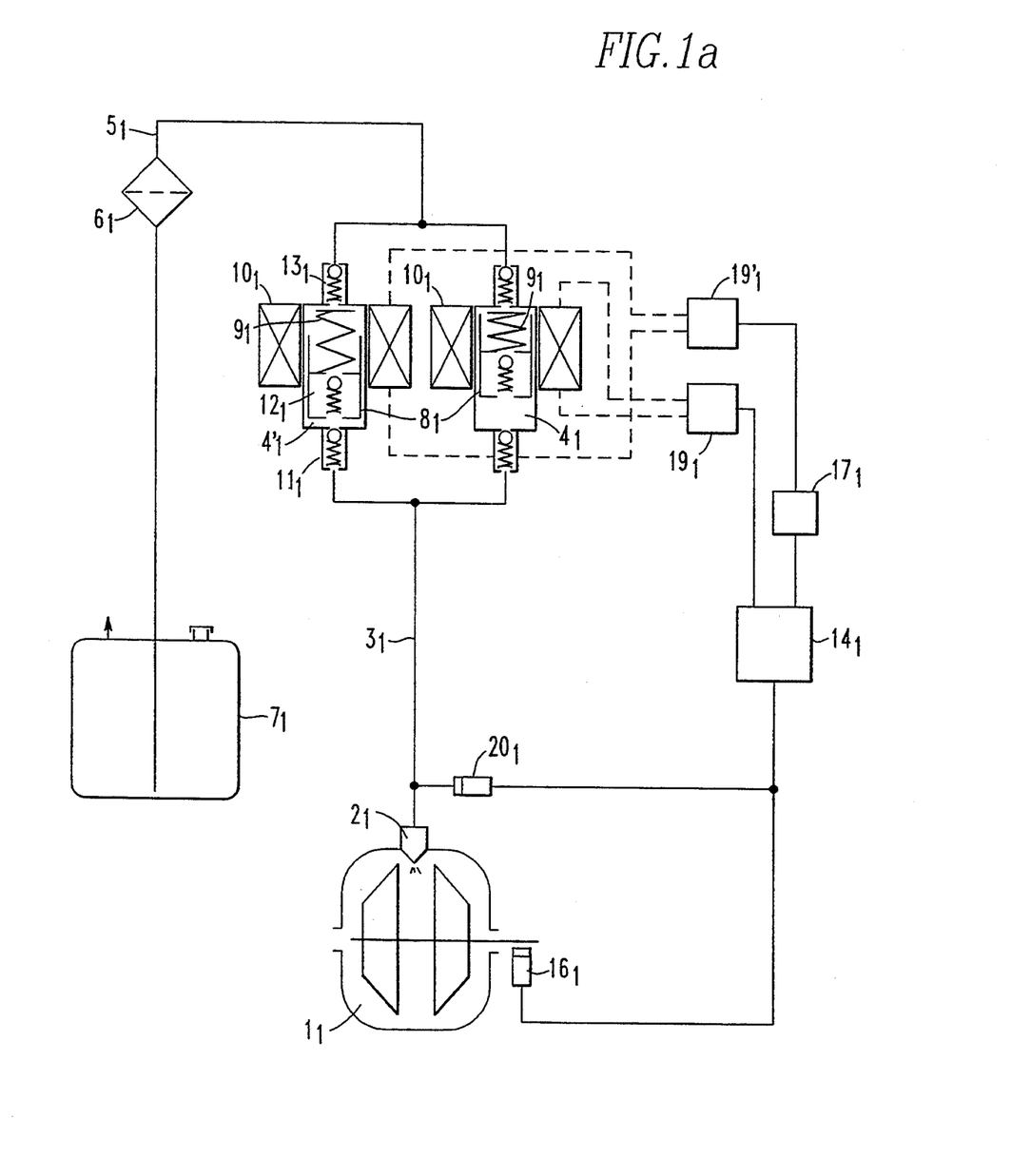
FIG. 1a and 2 are schematic illustrations of the structure of a fuel control unit.

As shown in FIG. 1a, a turbine 11 is supplied with fuel via a fuel injector $2_1$ and a feed line $3_1$ by piston pumps $4_1$, $4'_1$ which correspond to piston pumps 4 and 4' in FIG. 1. The fuel is taken in from a fuel tank $7_1$ via a suction line $5_1$ and a filter $6_1$, whereby no additional pre-feed pump is necessary, as long as the suction head does not exceed the physically allowable suction head.

The piston pumps $4_1$, $4'_1$ are shown as free-floating piston pumps with pistons $8_1$ and feed springs $9_1$, as well as drive magnets $10_1$. The piston pumps $4_1$ and $4^1$ have free-floating valving structures therein. The automatic non-return valves $11_1$ to $13_1$ are used to substantially assure or guarantee the correct delivery of the fuel.

The pumps $4_1$, $4'_1$ are activated by means of a pump control unit (pulse-width controller) $14_1$ with an alternating current signal $15_1$ (FIG. 2), the pulse-width of which is controlled by the load of the turbine, which can be interpreted, for example, on the basis of the turbine speed (sensor or transducer $16_1$) or the pressure upstream of the fuel injector $2_1$ (pressure sensor or transducer $20_1$). Both the positive portions of the pulse at $15_1$ (FIG. 2), and both (positive and negative) portions of the pulse at $15'_1$ can be used.

The invention teaches that the output signal from the one control unit $14_1$ can be inverted ($15_1$) in a phase-shifter $17_1$, and after the phase shifting ($15'_1$) can be amplified in power stages $19_1$, $19'_1$.

Figure 2:
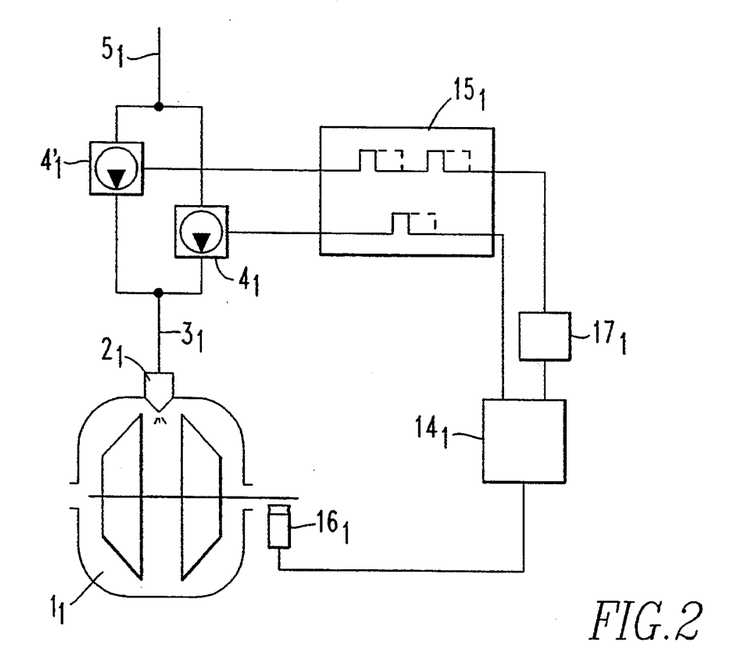
Figure 2A:
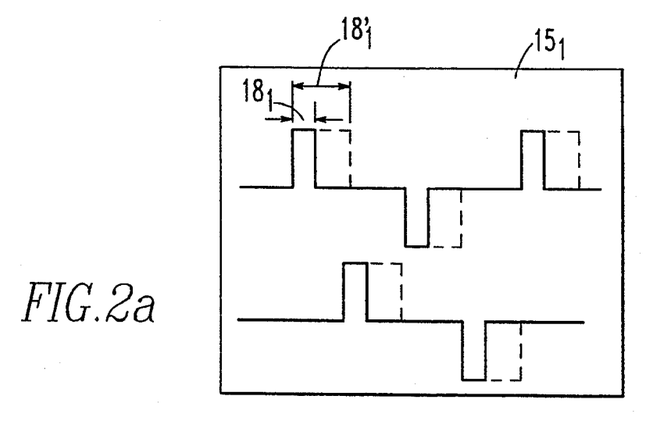
FIG. 2a is a diagram illustrating pulsed electric current for driving fuel pumps.

However, the use of a single control unit $14_1$ for both pumps is advantageous, as shown in FIGS. 1a and 2, whereby downstream of the control unit, the signal is split and inverted or phaseshifted for one pump $4'_1$.

Alternatively, in another embodiment, the pumps $4_1$, $4'_1$ could be modified to act as free-floating valves and an additional pump in line 5 could provide pressure for the fuel.

Additional pumps could be connected in parallel to a pump control unit (pulse-width controller) 14 and phase-shifter 17 to shift the signals by a corresponding angle such that if three pumps are present the signals would preferably be phase shifter from one another by 120°, if four pumps were provided the signal would preferably be shifted from one another by 90°, if five pumps were provided the signal would preferably be shifted from one another by 72°, and if six pumps were provided the signal would preferably be shifted from one another by 60°.

These signals could be generated by digital circuitry to provide the appropriate phase shifts between signals feeding each piston pump.

The increase in the number of piston pumps over one piston pump improves the performance and control of the fuel supply system and thus the performance of the gas turbine.

Some examples of pressure and other sensors and transducers may be found in U.S. Pat. No. 4,598,541, which issued Jul. 8, 1986, entitled: Hot Gas Generator, invented by Mori-Hiromitsu, Akagi-Kosuke and Kitahata-Hiroki; U.S. Pat. No. 4,271,859, which issued Jun. 9, 1981, entitled: Temperature Sensor, invented by Joseph W. Lawsing; U.S. Pat. No. 3,943,704, which issued Mar. 16, 1976, entitled: Temperature Control Device Before The Turbine Of A Gas-Turbine Power Unit, invented by Isaak Semenovich Ratner; and U.S. Pat. No. 3,918,254, which issued Nov. 11, 1975, entitled: Fuel Control For A Gas Turbine Having Auxiliary Air Bleed, invented by Donald E. Wernberg.

Some examples of speed and other sensors and transducers may be found in U.S. Pat. No. 5,103,636, which issued Apr. 14, 1992, entitled: Continuous Flow Fuel Control System, invented by Michael J. Bak; U.S. Pat. No. 5,080,496, entitled: Method And Apparatus For Compensated Temperature Prediction, invented by William J. Keim and Michael S. Idelchik; and U.S. Pat. No. 5,067,355, which issued Nov. 26, 1991, entitled: Shaft Torque Measurement, invented by James R. Witte.

Some examples of free-floating pumping and valving structures may be found in U.S. Pat. No. 5,215,117, which issued Jun. 1, 1993, entitled: Double-Check Filler Valve, invented by James A. Petersen, Herbert L. Flanigan, and David F. Zeiss; and U.S. Pat. No. 5,018,432, which issued May 28, 1991, entitled: Hydrostatic Steering Device With A Radially Free Floating Valve Member, invented by Hollis N. White, Jr.; U.S. Pat. No. 5,161,779, which issued Nov. 10, 1992, entitled: Magnet System, invented by Juergen Graner, Guenther Bantleon, Hans Kubach and Marcel Kirchner; and U.S. Pat. No. 4,979,955, which issued Dec. 25, 1990, invented by Robert M. Smith.

One feature of an invention resides broadly in the process for regulating the flow of liquid fuel for gas turbines, using piston pumps which transport the fuel to the fuel injector, characterized by the fact that the piston pumps $4_1$, $4'_1$ are activated by a pump control unit $14_1$ with an alternating current signal $15_1$, $15'_1$, the pulse-width $18_1$, $18'_1$ of which is controlled as a function of the turbine speed and/or the pressure upstream of the injector pump $2_1$.

Another feature of an invention resides broadly in the process, characterized by the fact that the drive signal $15_1$, $15'_1$ from the controller $14_1$ is inverted or phase-shifted in a phase shifter $17_1$, and is amplified in power stages $19_1$, $19'_1$.

Yet another feature of an invention resides broadly in the fuel control unit, characterized by the fact that both pumps $4_1$, $4'_1$ are driven by the same pulse-width control unit $14_1$, whereby for one of the two pumps $4_1$, $4'_1$ the drive signal $15_1$, $15'_1$ is inverted or phase-shifted.

Still another feature of an invention resides broadly in the fuel control unit, characterized by the fact that the stroke frequency of the piston pumps $4_1$, $4'_1$ is greater than 30 Hz.

Another feature of an invention resides broadly in the fuel control unit, characterized by the fact that at least two piston elements of the pumps $4_1$, $4'_1$ act on the same fuel injector $2_1$ in opposite phase to one another, whereby the piston elements are preferably driven in opposite phase to one another.

Yet another feature of an invention resides broadly in the fuel control unit, characterized by the fact that the length of the effective piston stroke of the pumps $4_1$, $4'_1$ can be modified.

Still yet another feature of an invention resides broadly in the fuel control unit, characterized by the fact that the fuel pumps $4_1$, $4'_1$ consist of electrical, inductively-driven, free-floating piston pumps, the stroke of which is controlled by changing the pulse-width $18_1$, $18'_1$ of the electric drive pulse $15_1$, $15'_1$.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 42 21 805, filed on Jul. 3, 1992, having inventors Peter Vertens and Bernd Dräger, and DE-OS P 42 21 805 and DE-PS P 42 21 805, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Other foreign patent publication applications, namely, Federal Republic of Germany Patent Application No. P 42 21 804, filed on Jul. 3, 1992, having inventors Peter Vertens and Bernd Dräger, and DE-OS P 42 21 804 and DE-PS P 42 21 804, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A process for starting and operating a gas turbine by means of a control device, the gas turbine for being operated at a rated speed, and the gas turbine comprising: a fuel injector for injecting fuel into the gas turbine, a compressor, speed sensor means for sensing a speed of the turbine, first pressure sensor means for sensing a pressure of the fuel injector, second pressure sensor means for sensing a pressure of the compressor, and pump means for feeding fuel into the gas turbine;

said process comprising:
feeding signals from the turbine speed sensor means, the first pressure sensor means for the injection pressure, and the second pressure sensor means for the compressor to said control device;
processing said signals relating to speed and pressure in said control device;
said process further comprising:
controlling, in a first stage of starting, an amount of fuel being fed into the gas turbine to provide a specified difference between the pressure within the compressor and the fuel injector pressure;
igniting the gas turbine;
increasing, in a second stage of starting, after said ignition, the amount of fuel being fed into the gas turbine to increase the turbine speed to the rated speed; and
maintaining, in a third, operational stage, the turbine at a substantially constant rate of speed substantially independent of load.

2. The process according to claim 1, wherein said control device comprises a startup controller for operating said gas turbine during starting of the gas turbine, and a speed governor for operating said gas turbine at the substantially constant rate of speed substantially independent of load, and said process further comprises the steps of:
controlling the pump means in the first stage of starting with said startup controller to adjust the amount of fuel being fed into the gas turbine to provide the specified difference between the pressure within the compressor and the fuel injector pressure;
controlling the pump means in the second stage of starting with said startup controller to increase the amount of fuel being fed into the gas turbine to increase the turbine speed to the rated speed; and
transferring the control of the pump means to said speed governor; and
controlling the pump means in the third, operational stage with said speed governor to maintain the turbine at the substantially constant rate of speed substantially independent of load.

3. The process according to claim 2, wherein, in the second stage of starting, said controlling of the pump means comprises increasing the amount of fuel being fed into the gas turbine at a predetermined rate over a predetermined period of time to increase the speed of the turbine to the rated speed at a predetermined rate in the predetermined period of time.

4. The process according to claim 3, wherein, in the third, operational stage, the turbine is configured to operate within an acceptable range of speed values and within acceptable ranges of pressure values for the fuel injector and the compressor pressures, and in the third, operational stage, said process further includes:
monitoring the fuel injector pressure, the compressor pressure and the turbine speed with said startup controller; and
producing one of:
a warning signal, and
a shut down signal for shutting down operation of the gas turbine,
with said startup controller when one one of: the turbine speed, the fuel injector pressure and the compressor pressure are not within the acceptable ranges of values.

5. The processor according to claim 4, wherein:
said process further comprises sensing an ignition criterion to ensure that ignition has occurred prior to increasing the amount of fuel being fed into the gas turbine in the second stage of starting,
said controlling of an amount of fuel being injected into the gas turbine comprises adjusting the amount of fuel being injected into the turbine as a function of the differences between the fuel injector pressure and the compressor pressure in at least one of: a combustion chamber and at a compressor outlet;
said adjusting determination being performed in said control device;
said first stage of starting, prior to said controlling of an amount of fuel being fed into the turbine, further comprises:
starting rotation of the turbine from a shut down phase;
increasing the speed of the turbine;
monitoring the compressor pressure during said increasing of the speed; and
starting the pump means to start injection of fuel into the turbine;
said specified pressure difference between the compressor pressure and the fuel injector pressure corresponds to an ignitable fuel-air mixture being injected into the turbine;
said transferring of control from the startup controller to the speed governor occurs shortly before the turbine reaches the rated speed;
said control device further comprises electronic signal processing circuits for processing signals from the speed sensor, the first pressure sensor means and the second pressure sensor means, prior to feeding of the signals to said startup controller and said speed governor;
said pump means comprises at least two dosing pumps, said at least two dosing pumps comprising piston pumps;
said gas turbine further comprises power supply means for supplying power to operate said two dosing pumps, said power supply means comprise means for generating pulse-width modulated currents to drive said at least two dosing pumps, and means for phase-shifting the pulse-width modulated current for at least one dosing pump relative to the pulse-width modulated current for at least one other dosing pump;
said piston pumps have a stroke frequency of greater than 30 Hz, and said piston pumps comprise electrical, inductively-driven, free floating piston pumps; and
said method further comprises operating said at least two dosing pumps in an out of phase relationship to provide a continuous supply of fuel to the turbine.

6. Control apparatus for starting and operating a gas turbine, the gas turbine for being operated at a rated speed, the gas turbine comprising: a fuel injector for injecting fuel into the gas turbine; a compressor; speed sensor means for sensing a speed of the turbine; first pressure sensor means for sensing a pressure of the fuel injector; second pressure sensor means for sensing a pressure of the compressor; pump means for feeding fuel into the gas turbine; and said control apparatus, said control apparatus comprising means for controlling starting and operation of the gas turbine, said control means comprising:
means for processing signals relating to speed and pressure;

means for feeding a speed signal from the turbine speed sensor means to said processing means;

means for feeding a first pressure signal for fuel injector pressure from the first pressure sensor means to said processing means;

means for feeding a second pressure signal for compressor pressure from the second pressure sensor means to said processing means;

means for controlling, in a first stage of starting, an amount of fuel being fed into the gas turbine to provide a specified difference between the pressure within the compressor and the fuel injector pressure;

means for increasing, in a second stage of starting, after said ignition, the amount of fuel being fed into the gas turbine to increase the turbine speed to the rated speed; and means for maintaining, in a third, operational stage, the turbine at a substantially constant rate of speed substantially independent of load.

7. The apparatus according to claim 6, wherein said control apparatus comprises:

a startup controller for operating said gas turbine during starting of the gas turbine;

a speed governor for operating said gas turbine at the substantially constant rate of speed substantially independent of load; and means for transferring control of operation from said startup controller to said speed governor;

said startup controller comprises said means for controlling an amount of fuel being fed into the gas turbine in said first stage, and said means for increasing the amount of fuel being fed into the gas turbine in said second stage; and said speed governor comprises said means for maintaining the turbine at a substantially constant rate of speed substantially independent of load in the third stage.

8. The apparatus according to claim 7, wherein:

said means for controlling an amount of fuel being fed into the gas turbine in said first stage comprises means for controlling the pump means in the first stage of starting to adjust the amount of fuel being fed into the gas turbine to provide the specified difference between the pressure within the compressor and the fuel injector pressure;

said means for increasing the amount of fuel being fed into the gas turbine in said second stage further comprises means for controlling the pump means in the second stage of starting with said startup controller to increase the amount of fuel being fed into the gas turbine to increase the turbine speed to the rated speed; and said means for transferring control of operation comprises means for transferring control of said pump means from said startup controller to said speed governor;

said means for maintaining the turbine at a substantially constant rate of speed substantially independent of load in the third stage comprises means for controlling the pump means in the third, operational stage to maintain the turbine at the substantially constant rate of speed substantially independent of load.

9. The apparatus according to claim 8, wherein said means for increasing the amount of fuel being fed into the gas turbine in said second stage comprises means for increasing the amount of fuel being fed into the gas turbine at a predetermined rate over a predetermined period of time to increase the speed of the turbine to the rate speed at a predetermined rate in the predetermined period of time.

10. The apparatus according to claim 9, wherein in the third, operational stage, the turbine is configured to operate within an acceptable range of speed values and within acceptable ranges of pressure values for the fuel injector and the compressor pressures, and said startup controller further comprises:

means for monitoring the fuel injector pressure, the compressor pressure and the turbine speed during said third operational stage; and means for producing one of:
a warning signal, and
a shut down signal for shutting down operation of the gas turbine, when one one of: the turbine speed, the fuel injector pressure and the compressor pressure are not within the acceptable ranges of values.

11. The apparatus according to claim 10, wherein:

said means for controlling an amount of fuel being injected into the gas turbine comprises means for adjusting the amount of fuel being injected into the turbine as a function of the difference between the fuel injector pressure and the compressor pressure in at least one of:

a combustion chamber and at a compressor outlet;

said specified pressure difference between the compressor pressure and the fuel injector pressure corresponds to an ignitable fuel-air mixture being injected into the turbine;

said means for transferring control from the startup controller to the speed governor comprises means for transferring control shortly before the turbine reaches the rated speed;

said control device further comprises electronic signal processing circuits for processing the signals from the speed sensor, the first pressure sensor means and the second pressure sensor means, prior to feeding of the signals to said startup controller and said speed governor; and said pump means comprises at least two dosing pumps.

12. The apparatus according to claim 11, wherein:

said electronic signal processing circuits further comprise:

a first signal processing circuit for processing the speed signal prior to feeding of the speed signal to said startup controller;

a second signal processing circuit for processing the speed signal prior to feeding of the speed signal to said speed governor;

a third signal processing circuit for processing the injector pressure signal prior to feeding of the injector pressure signal to said startup controller; and a fourth signal processing circuit for processing the compressor pressure signal prior to feeding of the compressor pressure signal to said startup controller;

said at least two dosing pumps comprise at least two piston pumps having a stroke frequency of greater than 30 Hz;

said at least two piston pumps comprise electrical, inductively-driven, free floating piston pumps;

said gas turbine further comprises power supply means for supplying power to operate said at least two piston pumps;

said power supply means comprise means for generating pulse-width modulated currents to drive said at least two piston pumps;

said power supply means comprise means for operating said at least two piston pumps in an out-of-phase relationship to provide a continuous supply of fuel to the turbine; and said means for operating out-of-phase comprise means for phase-shifting the pulse-width modulated current for at least one piston pump relative to the pulse-width modulated current for at least one other piston pump.

13. A process for starting and operating a gas turbine by means of a control device, the gas turbine for being operated at a rated speed, the gas turbine comprising: a fuel injector for injecting fuel into the gas turbine, a compressor, speed sensor means for sensing a speed of the turbine, first pressure sensor means for sensing a pressure of the fuel injector, second pressure sensor means for sensing a pressure of the compressor, pump means for feeding fuel into the gas turbine; and control means for controlling starting and operation of the gas turbine, said control means comprising: means for processing signals relating to speed and pressure, means for feeding a speed signal from the turbine speed sensor means to said processing means, means for feeding a first pressure signal for fuel injector pressure from the first pressure sensor means to said processing means, means for feeding a second pressure signal for compressor pressure from the second pressure sensor means to said processing means, means for controlling, in a first stage of starting, an amount of fuel being fed into the gas turbine to provide a specified difference between the pressure within the compressor and the fuel injector pressure, means for increasing, in a second stage of starting, after said ignition, the amount of fuel being fed into the gas turbine to increase the turbine speed to the rated speed; and means for maintaining, in a third, operational stage, the turbine at a substantially constant rate of speed substantially independent of load, said process comprising:

providing a fuel injector for injecting fuel into the gas turbine;

providing a compressor;

providing speed sensor means for sensing a speed of the turbine;

providing first pressure sensor means for sensing a pressure of the fuel injector;

providing second pressure sensor means for sensing a pressure of the compressor;

providing pump means for feeding fuel into the gas turbine;

providing said control apparatus, said providing of said control apparatus comprising:

providing means for processing signals relating to speed and pressure;

providing means for feeding a speed signal from the turbine speed sensor means to said processing means;

providing means for feeding a first pressure signal for fuel injector pressure from the first pressure sensor means to said processing means;

providing means for feeding a second pressure signal for compressor pressure from the second pressure sensor means to said processing means;

providing means for controlling, in a first stage of starting, an amount of fuel being fed into the gas turbine to provide a specified difference between the pressure within the compressor and the fuel injector pressure;

providing means for increasing, in a second stage of starting, after said ignition, the amount of fuel being fed into the gas turbine to increase the turbine speed to the rated speed; and providing means for maintaining, in a third, operational stage, the turbine at a substantially constant rate of speed substantially independent of load;

said process further comprising the steps of:

feeding signals from the turbine speed sensor means, the first pressure sensor means for the injection pressure, and the second pressure sensor means for the compressor to said control device;

processing said signals relating to speed and pressure in said control device;

controlling, in a first stage of starting, an amount of fuel being fed into the gas turbine to provide a specified difference between the pressure within the compressor and the fuel injector pressure;

igniting the gas turbine;

increasing, in a second stage of starting, after said ignition, the amount of fuel being fed into the gas turbine to increase the turbine speed to the rated speed; and maintaining, in a third, operational stage, the turbine at a substantially constant rate of speed substantially independent of load.

14. The process according to claim 13, wherein said control device comprises: a startup controller for operating said gas turbine during starting of the gas turbine; a speed governor for operating said gas turbine at the substantially constant rate of speed substantially independent of load; and means for transferring control of the pump means from said startup controller to said speed governor; said startup controller comprises said means for controlling an amount of fuel being fed into the gas turbine in said first stage, and said means for increasing the amount of fuel being fed into the gas turbine in said second stage; and said speed governor comprises said means for maintaining the turbine at a substantially constant rate of speed substantially independent of load in the third stage, and said process further comprises the steps of:

controlling said first and second stages of startup with said startup controller;

transferring control of the pump means from the startup controller to said speed governor; and controlling operation of said gas turbine during said third stage with said speed governor.

15. The process according to claim 14, wherein: said means for controlling an amount of fuel being fed into the gas turbine in said first stage comprises means for controlling the pump means in the first stage of starting to adjust the amount of fuel being fed into the gas turbine to provide the specified difference between the pressure within the compressor and the fuel injector pressure; said means for increasing the amount of fuel being fed into the gas turbine in said second stage further comprises means for controlling the pump means in the second stage of starting with said startup controller to increase the amount of fuel being fed into the gas turbine to increase the turbine speed to the rated speed; and said means for maintaining the turbine at a substantially constant rate of speed substantially independent of load in the third stage comprises means for controlling the pump mans in the third, operational stage to maintain the turbine at the substantially constant rate of speed substantially independent of load, and said process further comprises:

controlling an amount of fuel being fed into the gas turbine in said first stage by controlling the pump means in the first stage with said startup controller to adjust the amount of fuel being fed into the gas turbine to provide the specified difference between the pressure within the compressor and the fuel injector pressure;

increasing the amount of fuel being fed into the gas turbine in said second stage by controlling the pump means in said second stage with said startup controller to increase the amount of fuel being fed into the gas turbine to increase the turbine speed to the rated speed; and maintaining the turbine at a substantially constant rate of speed substantially independent of load in the third stage by controlling the pump means in the third, operational stage with said speed governor to maintain the turbine at the substantially constant rate of speed substantially independent of load.

16. The process according to claim 15, wherein said means for increasing the amount of fuel being fed into the gas turbine in said second stage comprises means for increasing the amount of fuel being fed into the gas turbine at a predetermined rate over a predetermined period of time to increase the speed of the turbine to the rated speed at a predetermined rate in the predetermined period of time, and said process further comprises:

increasing the amount of fuel being fed into the gas turbine at a predetermined rate over a predetermined period of time to increase the speed of the turbine to the rated speed at a predetermined rate in the predetermined period of time.

17. The process according to claim 16, wherein in the third, operational stage, the turbine is configured to operate within an acceptable range of speed values and within acceptable ranges of pressure values for the fuel injector and the compressor pressures, and said startup controller further comprises: means for monitoring the fuel injector pressure, the compressor pressure and the turbine speed during said third operational stage; and means for producing one of: a warning signal, and a shut down signal for shutting down operation of the gas turbine, when one one of: the turbine speed, the fuel injector pressure and the compressor pressure are not within the acceptable ranges of values, and said process further comprises:

monitoring the fuel injector pressure, the compressor pressure and the turbine speed during said third operational stage;

producing one of: the warning signals, and the shut down signal for shutting down operation of the gas turbine, when one one of: the turbine speed, the fuel injector pressure and the compressor pressure are not within the acceptable ranges of values.

18. The process according to claim 17, wherein: said means for controlling an amount of fuel being injected into the gas turbine comprises means for adjusting the amount of fuel being injected into the turbine as a function of the difference between the fuel injector pressure and the compressor pressure in at least one of: a combustion chamber and at a compressor outlet; said specified pressure difference between the compressor pressure and the fuel injector pressure corresponds to an ignitable fuel-air mixture being injected into the turbine; said means for transferring control from the startup controller to the speed governor comprises means for transferring control shortly before the turbine reaches the rated speed; said control device further comprises electronic signal processing circuits for processing the signals from the speed sensor, the first pressure sensor means and the second pressure sensor means, prior to feeding of the signals to said startup controller and said speed governor; said pump means comprises at least two dosing pumps; and said process further comprises the steps of:

sensing an ignition criterion to ensure that ignition has occurred prior to increasing the amount of fuel being fed into the gas turbine in the second stage of starting;

controlling an amount of fuel being injected into the gas turbine as a function of the difference between the fuel injector pressure and the compressor pressure at at least one of: the combustion chamber and the compressor outlet;

in said first stage of starting, prior to said controlling of an amount of fuel being fed into the turbine:

starting rotation of the turbine from a shut down phase;

increasing the speed of the turbine;

monitoring the compressor pressure during said increasing of the speed; and starting the pump means to start injection of fuel into the turbine;

transferring control from the startup controller to the speed governor occurs shortly before the turbine reaches the rated speed; and processing the signals from the speed sensor, the first pressure sensor means and the second pressure sensor means, in said signal processing circuits prior to feeding of the signals to said startup controller and said speed governor.

19. The process according to claim 18, wherein: said electronic signal processing circuits further comprise: a first signal processing circuit for processing the speed signal prior to feeding of the speed signal to said startup controller; a second signal processing circuit for processing the speed signal prior to feeding of the speed signal to said speed governor; a third signal processing circuit for processing the injector pressure signal prior to feeding of the injector pressure signal to said startup controller; and a fourth signal processing circuit for processing the compressor pressure signal prior to feeding of the compressor pressure signal to said startup controller; said at least two dosing pumps comprise at least two piston pumps having a stroke frequency of greater than 30 Hz; said at least two piston pumps comprise electrical, inductively-driven, free floating piston pumps; said gas turbine further comprises power supply means for supplying power to operate said at least two piston pumps; said power supply means comprise means for generating pulse-width modulated currents to drive said at least two piston pumps; said power supply means comprise means for operating said at least two piston pumps in an out-of-phase relationship to provide a continuous supply of fuel to the turbine; and said means for operating out-of-phase comprise means for phase-shifting the pulse-width modulated current for at least one piston pump relative to the pulse-width modulated current for at least one other piston pump, said method further comprises the steps of:

processing the speed signal in the first signal processing circuit prior to feeding of the speed signal to said startup controller;

processing the speed signal in the second signal processing circuit for prior to feeding of the speed signal to said speed governor;

processing the injector pressure signal in the third signal processing circuit prior to feeding of the injector pressure signal to said startup controller;

processing the compressor pressure signal in the fourth signal processing circuit prior to feeding of the compressor pressure signal to said startup controller;

configuring said at least two dosing pumps as at least two piston pumps and operating said at least two piston pumps at a stroke frequency of greater than 30 Hz;

configuring said at least two piston pumps as electrical, inductively-driven, free floating piston pumps; said gas turbine further comprises power supply means for supplying power to operate said at least two piston pumps;

configuring said power supply means to comprise means for generating pulse-width modulated currents to drive said at least two piston pumps;

configuring said power supply means to comprise means for operating said at least two piston pumps in an out of phase relationship by phase-shifting the pulse-width modulated current for at least one piston pump relative to the pulse-width modulated current for at least one other piston pump to provide a continuous supply of fuel to the turbine; and operating said at least two piston pumps in an out of phase relationship to provide a continuous supply of fuel to the turbine.

* * * * *

UNITED STATES PATENT AND TRADEMARK OFFICE
CERTIFICATE OF CORRECTION

PATENT NO. : 5,369,948
DATED : December 6, 1994
INVENTOR(S) : Peter VERTENS and Bernd DRÄGER It is certified that error appears in the above-indentified patent and that said Letters Patent is hereby corrected as shown below:

In column 6, line 26, after 'turbine', delete "11" and insert --$1_1$--.

In column 10, line 8, Claim 5, after the first occurrence of 'the', delete "differences" and insert --difference--.

In column 12, line 3, Claim 9, before 'speed', delete the first occurrence of "rate" and insert --rated--.

In column 14, line 67, Claim 15, after 'pump', delete "mans" and insert --means--.

In column 15, line 54, Claim 17, after 'warning', delete "signals," and insert --signal,--.

In column 12, line 18, Claim 10, after the first occurrence of 'one' delete the second occurrence of "one".

UNITED STATES PATENT AND TRADEMARK OFFICE
CERTIFICATE OF CORRECTION

PATENT NO. : 5,369,948
DATED : December 6, 1994
INVENTOR(S) : Peter VERTENS and Bernd DRÄGER It is certified that error appears in the above-indentified patent and that said Letters Patent is hereby corrected as shown below:

In column 15, line 47, Claim 17, after the first occurrence of 'one' delete the second occurrence of "one".

In column 15, line 56, Claim 17, after the first occurrence of 'one' delete the second occurrence of "one".

Signed and Sealed this

Eighteenth Day of March, 1997

Attest:

BRUCE LEHMAN

Attesting Officer

Commissioner of Patents and Trademarks